US007209960B2

(12) United States Patent
Veselov (10) Patent No.: US 7,209,960 B2
(45) Date of Patent: Apr. 24, 2007

(54) LOADING AND SAVING DATA FROM SECURITY SENSITIVE APPLETS TO A LOCAL FILE SYSTEM

(75) Inventor: Pavel S. Veselov, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 903 days.

(21) Appl. No.: 10/251,283

(22) Filed: Sep. 20, 2002

(65) Prior Publication Data

US 2004/0060053 A1 Mar. 25, 2004

(51) Int. Cl.
*G06F 15/16* (2006.01)

(52) U.S. Cl. .............. 709/219; 717/115; 715/513; 719/310

(58) Field of Classification Search ........ 709/218, 709/203, 219; 345/744; 704/1; 707/513; 717/115; 715/513; 719/310
See application file for complete search history.

(56) References Cited

U.S. PATENT DOCUMENTS 6,976,059 B1 * 12/2005 Rogalski et al. ............ 709/218

| 2001/0003824 | A1 * | 6/2001 | Schnier ............... 709/203 |
| 2001/0056462 | A1 * | 12/2001 | Kataoka ............. 709/203 |
| 2002/0018077 | A1 * | 2/2002 | Powlette ............ 345/744 |
| 2002/0023111 | A1 * | 2/2002 | Arora et al. ........ 707/513 |
| 2002/0069266 | A1 | 6/2002 | Lakhdhir |
| 2003/0028363 | A1 * | 2/2003 | Nobili et al. ......... 704/1 |

FOREIGN PATENT DOCUMENTS

WO WO 02/027489 A3 4/2002

OTHER PUBLICATIONS

Maarek et al., "*WebCutter: a system for dynamic and tailorable site mapping*," Computer Networks and ISDN Systems, 1997, pp. 1269-1279, vol. 29, 1997, Elsevier Science B.V.

* cited by examiner

*Primary Examiner*—Jungwon Chang
(74) *Attorney, Agent, or Firm*—Martine Penilla & Gencarella, LLP (57) ABSTRACT

A method and apparatus is provided for saving and loading Java applet data to and from, respectively, a local file system of a client computer system. It is not necessary to render the local file system accessible to the Java applet to save and load the Java applet data. Thus, the Java applet data is saved and loaded without compromising the security of the local file system and without requiring special certification of the Java applet.

26 Claims, 7 Drawing Sheets

LOADING AND SAVING DATA FROM SECURITY SENSITIVE APPLETS TO A LOCAL FILE SYSTEM

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to data transfer between networked computer systems, and more particularly, to methods for saving security sensitive Java applet data to a local file system of a client computer system.

2. Description of the Related Art

With networked computer systems, such as the Internet, it is common to have a client computer system ("client") in communication with a server computer system ("server"). The client can connect to the server through a browser interface using a universal resource locator (URL) that points to the server. Generally, the URL points to a particular HTML file located on the server. The browser interface running on the client displays the content of the HTML file referenced by the URL.

The HTML files may contain references to Java applets ("applets") that reside on the server computer system. Generally, when the HTML file displayed in the browser contains a reference to an applet, the applet is downloaded and run within the browser. Applets are computer programs that can be implemented to perform a variety of tasks including those involving access to the client's local file system. Thus, it is conceivable that implementation of some applets can damage the client's local file system through actions such as saving, deleting, and executing files. To prevent applets or other browser interface content from damaging the client's local file system, most browser interfaces incorporate a security protocol.

Typically, the browser interface security protocol allows a user to set a level of security. A normal level of security usually prevents applets from accessing the client's local file system. To allow the applet to access the client's local file system, the user usually needs to lower the browser interface security level. In general, lowering the browser interface security level provides the applet, and any other content that can access the browser interface, increased access to the client's local file system. Thus, lowering the security level for a particular applet leaves the client's local file system vulnerable to other rogue processes that may seek to cause damage.

It is often desirable to save an applet's current data for subsequent use. Since the applet is restricted for security reasons from writing to the client's local file system, an alternative method for saving the applet's current data is required. One common alternative method requires the applet to be certified by a third party as being safe for receiving access to the client's local file system. The browser security protocol can be set to allow such certified applets to have limited access to the client's local file system. However, obtaining a third party certification for an applet is costly and time consuming. Therefore, few applets that are actually safe have the third party certification. Another common method for saving the applet's current data involves saving the data to the server from which the applet was provided. This method requires the development of a storage structure (e.g., database) to receive and store the applet's data and identification for numerous clients. The development and maintenance of such a storage structure generally involves substantial expense.

In view of the foregoing, there is a need for a method and a computer implemented process for saving and loading untrusted applet data to and from, respectively, the client's local file system. The untrusted applet data should be saved and loaded without compromising the security of the local file system and without special certification of the applet.

SUMMARY OF THE INVENTION

Broadly speaking, the present invention fills these needs by providing methods and computer program instructions for saving untrusted Java applet ("applet") data to a local file system of a client computer system. The untrusted applet data can be saved without compromising the security of the local file system and without requiring special certification of the applet. In a complementary manner, the present invention also provides a method and an apparatus for loading applet data from the local file system of the client computer system back to the applet. It should be appreciated that the present invention can be implemented in numerous ways, including as a process, an apparatus, a system, a device, or a method. Several embodiments of the present invention are described below.

In one embodiment, a method for saving data from an applet to a local file system is disclosed. The method includes downloading an applet from a server computer system to a client computer system. The downloaded applet is executed at the client computer system to produce a current applet state defined by a set of data. The method further includes a browser window being opened by the applet at the client computer system. The applet provides a universal resource locator (URL) to the browser window. The URL references a script located on the server computer system and provides the set of data to the script. The URL reference to the script causes the script to be executed on the server computer system. The method further includes the script sending the set of data from the server computer system to the browser window at the client computer system. The method concludes by displaying a dialog within the browser window at the client computer system. The dialog directs a user to select a location on a local file system of the client computer system for saving the set of data that defines the current applet state.

In another embodiment, a method for loading data from a local file system to an applet is disclosed. The method includes downloading an applet from a server computer system to a client computer system. The downloaded applet is executed in a first browser window at the client computer system. The applet communicates to the server computer system with a first URL referencing a first script located on the server computer system. The applet also opens a second browser window at the client computer system and provides the second browser window with a second URL referencing a second script located on the server computer system. The method includes execution of the first script located on the server computer system, whereby the first script interrogates the server computer system. The method further includes execution of the second script located on the server computer system, whereby the second script provides a dialog within the second browser window at the client computer system. The dialog directs a user to select a file located on a local file system of the client computer system, wherein the file to be selected contains a set of data defining a previous applet state to be transferred to the server computer system. The method further includes transferring a set of data from a user selected file on a local file system of the client computer system to the server computer system. The transferred set of data is received by a third script located on the server computer system. The method further includes execution of the third script located on the server computer system. Execution of the third script is initiated by the transfer of the set of data from the user selected file on the local file system of the client computer system. The third script places the transferred set of data on the server computer system. The first script interrogating the server computer system identifies the transferred set of data. The set of data defining the previous applet state is transferred from the server computer system to the applet.

In another embodiment, a computer program embodied on a computer readable medium for saving data from an applet to a local file system is disclosed. The computer program includes instructions for downloading an applet from a server computer system to a client computer system. The downloaded applet is executed at the client computer system to produce a current applet state defined by a set of data. The computer program includes further instructions for a browser window to be opened by the applet at the client computer system. The applet provides a universal resource locator (URL) to the browser window. The URL references a script located on the server computer system and provides the set of data to the script. The URL reference to the script causes the script to be executed on the server computer system. The computer program includes further instructions for the script to send the set of data from the server computer system to the browser window at the client computer system. A dialog is displayed within the browser window at the client computer system. The dialog directs a user to select a location on a local file system of the client computer system for saving the set of data that defines the current applet state.

In another embodiment, a computer program embodied on a computer readable medium for loading data from a local file system to an applet is disclosed. The computer program includes instructions for downloading an applet from a server computer system to a client computer system. The downloaded applet is executed in a first browser window at the client computer system. The computer program instructions direct the applet to communicate with the server computer system using a first URL referencing a first script located on the server computer system. The computer program further instructs the applet to open a second browser window at the client computer system and provide the second browser window with a second URL referencing a second script located on the server computer system. The computer program instructions direct the first script located on the server computer system to be executed, whereby the first script interrogates the server computer system. The computer program instructions also direct the second script located on the server computer system to be executed, whereby the second script provides a dialog within the second browser window at the client computer system. The dialog directs a user to select a file located on a local file system of the client computer system, wherein the file to be selected contains a set of data defining a previous applet state to be transferred to the server computer system. The computer program instructions further direct the transfer of a set of data from a user selected file on a local file system of the client computer system to the server computer system. The transferred set of data is received by a third script located on the server computer system. Execution of the third script is initiated by the transfer of the set of data from the user selected file on the local file system of the client computer system. The third script places the transferred set of data on the server computer system. The first script interrogating the server computer system identifies the transferred set of data. The computer program further instructs the first script interrogating the server computer system to identify the transferred set of data. The computer program directs the transfer of the set of data defining the previous applet state from the server computer system to the applet.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for methods and computer program instructions for saving and loading untrusted Java applet ("applet") data to and from, respectively, a local file system of a client computer system. Broadly speaking, the present invention allows applet data to be saved to the local file system without compromising the security of the local file system and without requiring special certification of the applet. In a complementary manner, the present invention allows applet data previously saved to the local file system to be loaded back to the applet for further use. With the present invention, applet data can be safely saved to and loaded from the local file system without having to render the local file system accessible to the untrusted applet.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
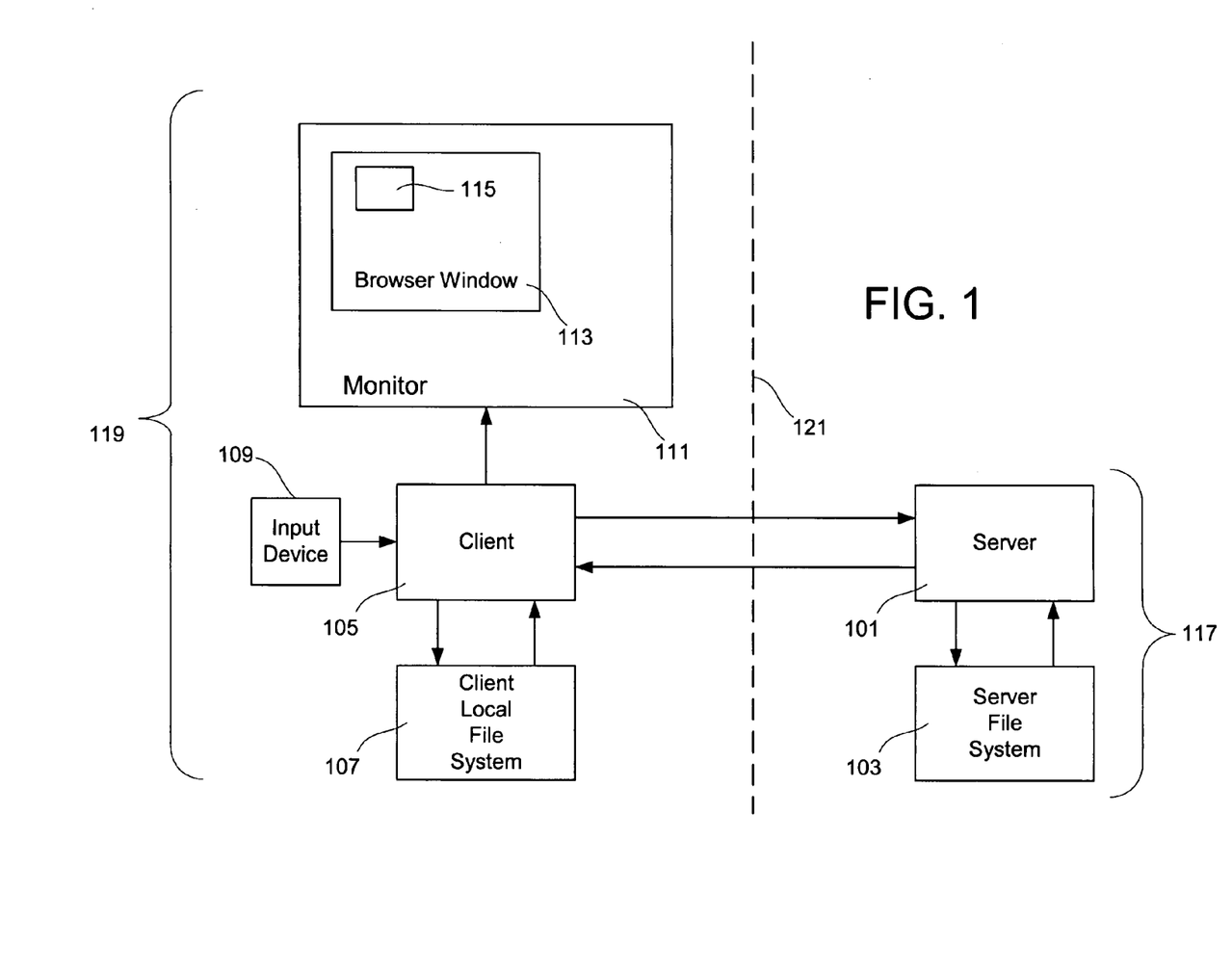
FIG. 1 is an illustration showing a client computer system ("client") in communication with a server computer system ("server"), in accordance with one embodiment of the present invention.

FIG. 1 is an illustration showing a client computer system ("client") 119 in communication with a server computer system ("server") 117, in accordance with one embodiment of the present invention. The client 119 includes a client computing platform 105 capable of receiving data, performing data manipulation operations, and outputting data. The client computing platform 105 is in communication with a client local file system 107. The client computing platform 105 can send data to and retrieve data from the client local file system 107. The client computing platform 105 is also in communication with one or more input devices 109 capable of providing input supplied from a user to the client computing platform 105. The client computing platform 105 is configured to receive the user supplied input and provide an appropriate response based on a pre-configured logic. The client computing platform 105 is in further communication with a monitor 111 capable of visually displaying data provided from the client computing platform 105. In one embodiment, the client computing platform 105 is capable of executing a program for an Internet browser. During execution of the program for the Internet browser, data is provided from the client computing platform 105 to the monitor 111 to display a browser window 113. The browser window 113 is generally provided with a set of user executable functions for opening files, saving files, or connecting to an Internet address using a universal resource locator (URL).

A common use of the browser window 113 is to connected the client 119 to the server 117 over a network 121 by using a URL associated with a browser displayable interface file (e.g., HTML file or Web page) residing on the server 117. The server 117 includes a server computing platform 101 and a server file system 103. In one embodiment, the server computing platform 101 is a Web server. The files having content provided by the server 117 to be displayed within the client 119 browser window 113 are maintained on the server file system 103. The client computing platform 105 and the server computing platform 101 can be networked together to facilitate data transfer and communication. The Internet provides a common pathway by which the client computing platform 105 can connect to the server computing platform 101. The Internet includes a large number of server computing platforms 101 to which the client computing platform 105 can connect. An applet 115 is a common type of content provided by the server 117 to be run in a Web page displayed in the browser window 113 at the client 119.

As embodiments of the present invention can implement Java™ (hereinafter "Java") technology, a brief introduction to Java is provided below. Nevertheless, this brief introduction to Java should not be considered as limiting as Java technology is well known by those skilled in the art. Java is a programming language. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium, and large, without modification. Developed by Sun, Java has been promoted and geared heavily for the Web, both for public Web sites and intranets. Generally, Java programs can be called from within HTML documents or launched standalone. When a Java program runs from a Web page, it is called an "applet," and when run on a Web server, the application is called a "servlet."

Java is an interpreted language. The source code of a Java program is compiled into an intermediate language called "byte code." The byte code is then converted (interpreted) into machine code at runtime. Upon finding an applet, the Web browser invokes a Java interpreter (Java Virtual Machine), which translates the byte code into machine code and runs it. Thus, applets are not dependent on any specific hardware and will run in any computer with the Java Virtual Machine software.

Figure 2:
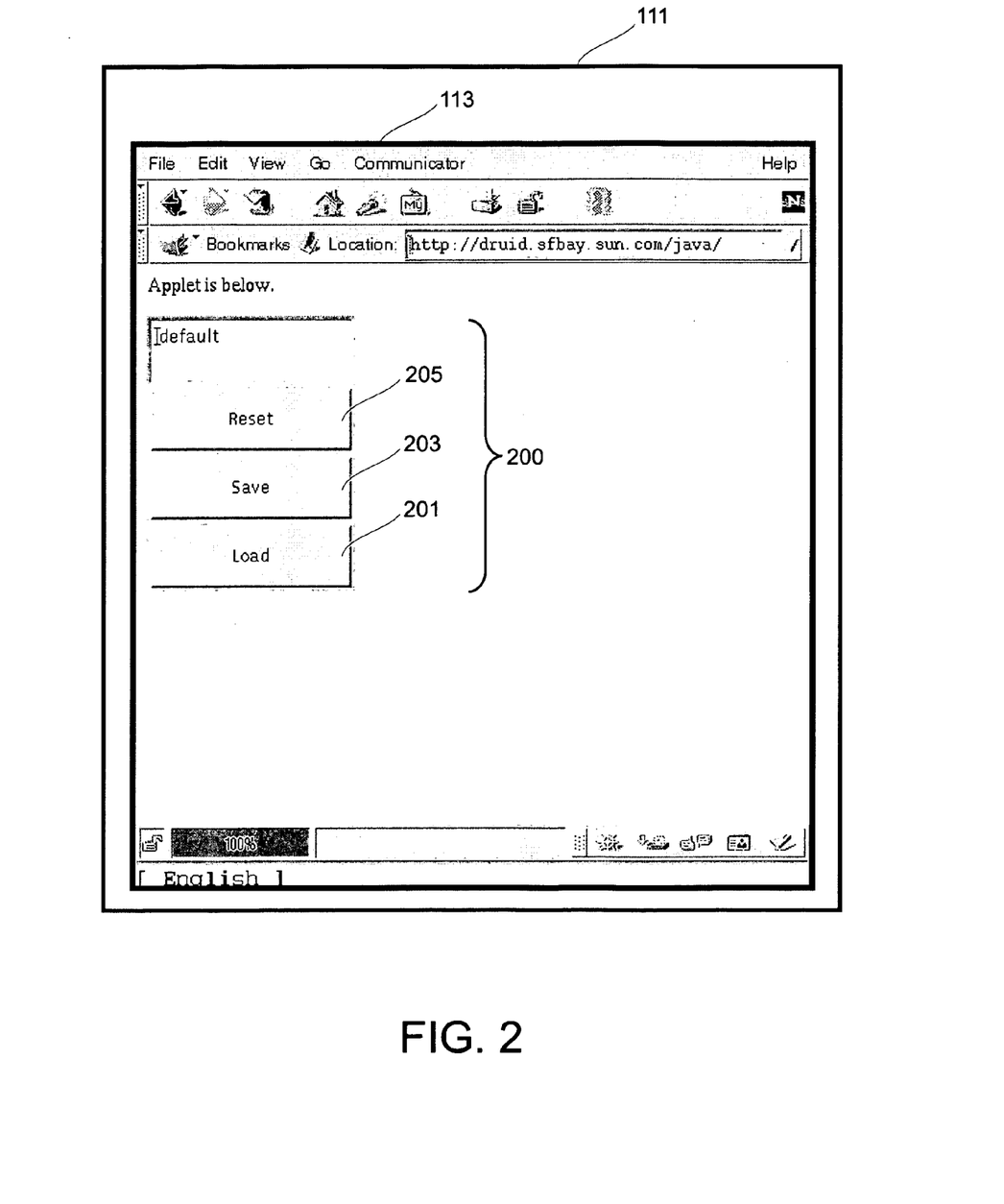
FIG. 2 is an illustration showing an exemplary applet, in accordance with one embodiment of the present invention.

FIG. 2 is an illustration showing an exemplary applet 200, in accordance with one embodiment of the present invention. The exemplary applet 200 is displayed within the browser window 113 which is displayed on the monitor 111 of the client 119. The exemplary applet 200 shows a "LOAD" graphical user interface (GUI) button 201, a "SAVE" GUI button 203, and a "RESET" GUI button 205. Each of the aforementioned GUI buttons are executable by a user of the client 119 through a number of different input devices 109 (e.g., a mouse click, a keyboard stroke, a voice activation, a touch screen activation, etc . . . ). The "SAVE" GUI button 203 is configured to initiate a method for saving a set of data defining a current state of the exemplary applet 200, wherein the set of data is saved to the client local file system 107. The "LOAD" GUI button 201 is configured to initiate a method for loading a set of data defining a previous state of the exemplary applet 200, wherein the set of data is loaded from the client local file system 107. The "RESET" GUI button 205 is configured to reset the exemplary applet 200 to a default state. The user executable "SAVE", "LOAD", and "RESET" options can be implemented in a variety of ways other than with GUI buttons (e.g., pull down menus, toolbars, links, etc . . . ). Additionally, it should be understood that the names of "SAVE", "LOAD", and "RESET" are used to identify the function performed by the process, and any suitable name can be substituted therefore so long as an equivalent function is performed.

Figure 3:
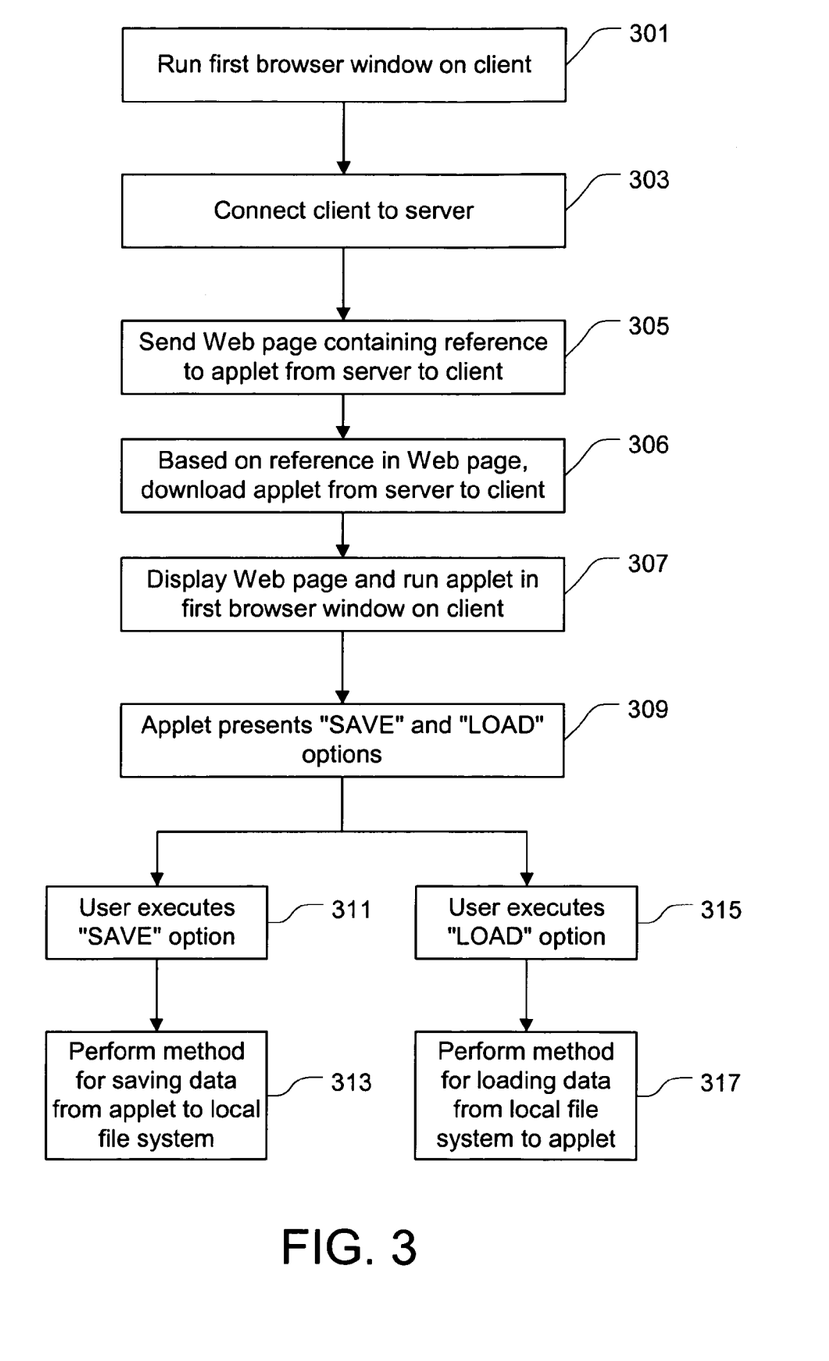
FIG. 3 shows a flowchart illustrating a method for implementing an applet that provides the user executable SAVE and LOAD options, in accordance with one embodiment of the present invention.

FIG. 3 shows a flowchart illustrating a method for implementing an applet that provides the user executable SAVE and LOAD options, in accordance with one embodiment of the present invention. An operation 301 includes running a first browser window on the client 119, wherein the first browser window corresponds to an instantiation of a browser by a user of the client 119. In an operation 303, the client 119 is connected to the server 117. The connection between the client 119 and the server 117 facilitates data transfer between the client 119 and the server 117. For security reasons, the server 117 is typically restricted from accessing the client local file system 107. However, the server 117 is in communication with the first browser window. In an operation 305, the server 117 sends a Web page to the client 119. The Web page contains a reference to an applet located on the server 117. In an operation 306, the applet referenced in the Web page is downloaded from the server 117 to the client 119. In an operation 307, the Web page is displayed in the first browser window on the client 119, and the applet downloaded from the server 117 is run within the Web page. In an operation 309, the applet presents user executable "SAVE" and "LOAD" options. The "SAVE" option allows a user to save a set of data defining the current state of the applet to the client local file system 107. The "LOAD" option allows a user to load a set of data defining a previously saved state of the applet from the client local file system 107. User execution of the "SAVE" and "LOAD" options are embodied in operations 311 and 315, respectively. Upon user execution of the "SAVE" option in operation 311, a method for saving the set of data defining the current applet state from the applet to the client local file system 107 is performed, as indicated by an operation 313. Upon user execution of the "LOAD" option in operation 315, a method for loading the set of data defining the previously saved applet state from the client local file system 107 to the applet is performed, as indicated by an operation 317. The applet runs continuously until the Web page is closed.

Figure 4:
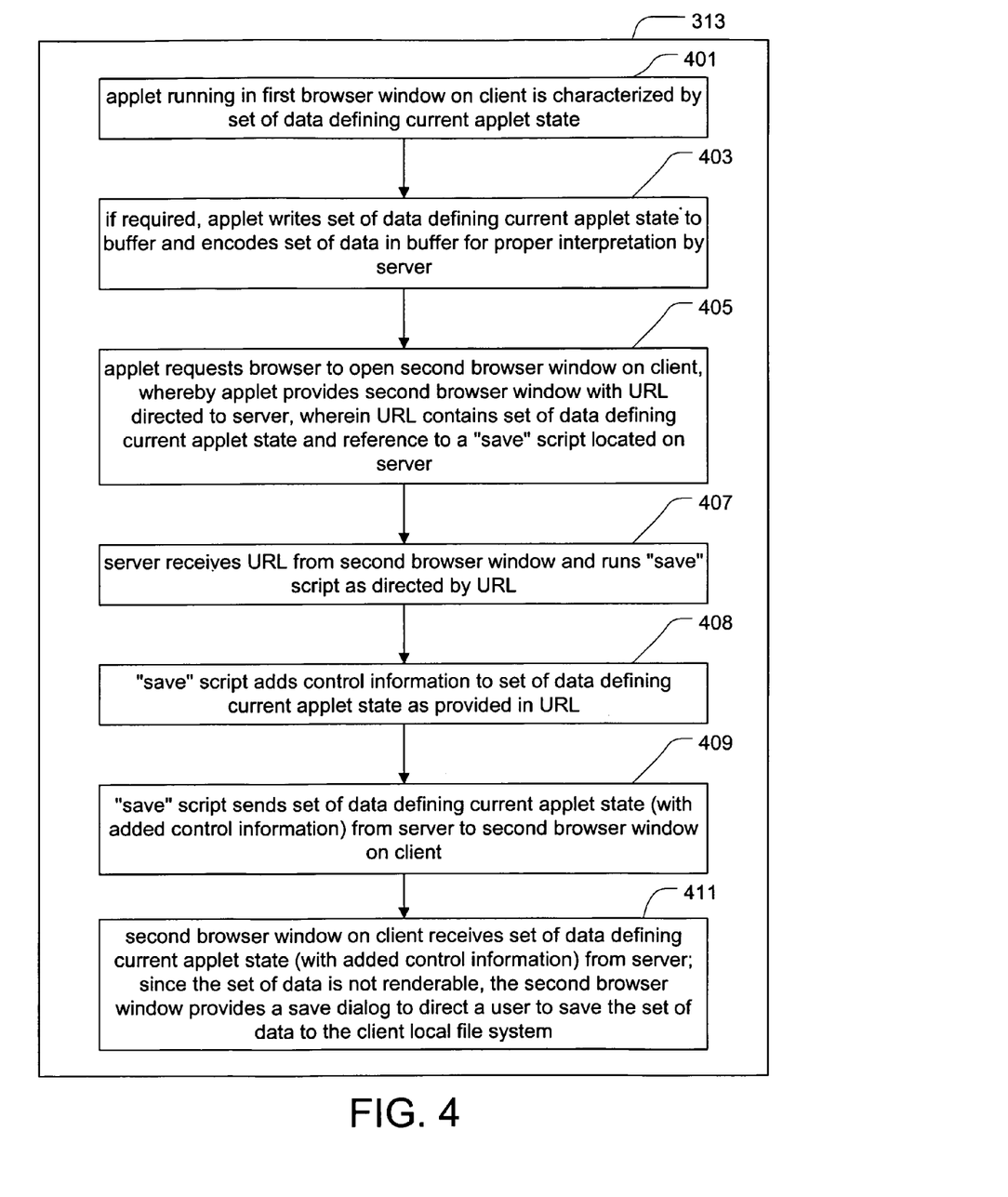
FIG. 4 shows a flowchart illustrating the method for saving the set of data defining the current applet state from the applet to the client local file system, in accordance with one embodiment of the present invention.

FIG. 4 shows a flowchart illustrating the method for saving the set of data defining the current applet state from the applet to the client local file system 107, in accordance with one embodiment of the present invention. The flowchart shown in FIG. 4 provides a more detailed view of the method referenced in operation 313 of FIG. 3. The method begins with an operation 401 in which the applet running in the first browser window on the client 119 is characterized by a set of data defining the applet current state. An operation 403 provides an option for writing the set of data defining the applet current state to a buffer to be encoded, wherein the encoded set of data is capable of being properly interpreted by the server and the browser. A URL is to be used to transfer the data between the client 119 and the server 117. Whenever the set of data defining the applet current state conflicts with a URL syntax definition used by both the browser and the server, if being appended as is, it is necessary to perform operation 403. Operation 403 ensures that the encoded set of data does not interfere with the URL syntax definition causing either the browser or the server to misinterpret the resource location. The method continues with an operation 405 in which the applet running in the first browser window on the client 119 requests the browser to open a second browser window on the client 119. The applet provides the second browser window with a URL directed to the server 117. The URL provided to the second browser window contains the set of data defining the current applet state and a reference to a "save" script located on the server 117. In an operation 407 the server 117 receives the URL from the second browser window on the client 119 and runs the "save" script as directed by the URL. In an operation 408 the "save" script adds control information to the set of data defining the current applet state as provided in the URL. Control information usually includes special headers that the server needs to send back to the browser to provide information about the set of data defining the current applet state. Examples of types of control information include, but are not limited to, a data type, a data length, a last-modified data's date, etc. The data type should be set to a data type that is not renderable by the browser. In an operation 409 the "save" script sends the set of data defining the current applet state, with added control information, from the server 117 to the second browser window on the client 119. In an operation 411 the second browser window on the client 119 receives the set of data defining the current applet state, with added control information, from the server 117. The set of data is not renderable in the second browser window. Therefore, the second browser window provides a save dialog to direct a user to save the set of data to the client local file system 107. In this manner, the set of data defining the current applet state is saved to the client local file system 107. It should be understood that the name of the "save" script can be substituted with another suitable name so long as the script performs an equivalent function.

The method for saving the set of data defining the current applet state from the applet to the client local file system 107 does not require the applet to obtain access to the client local file system 107. Furthermore, the set of data defining the current applet state is not executable outside the context of the applet. Therefore, the security of the client local file system 107 is not compromised by the method for saving the set of data defining the current applet state.

Figure 5:
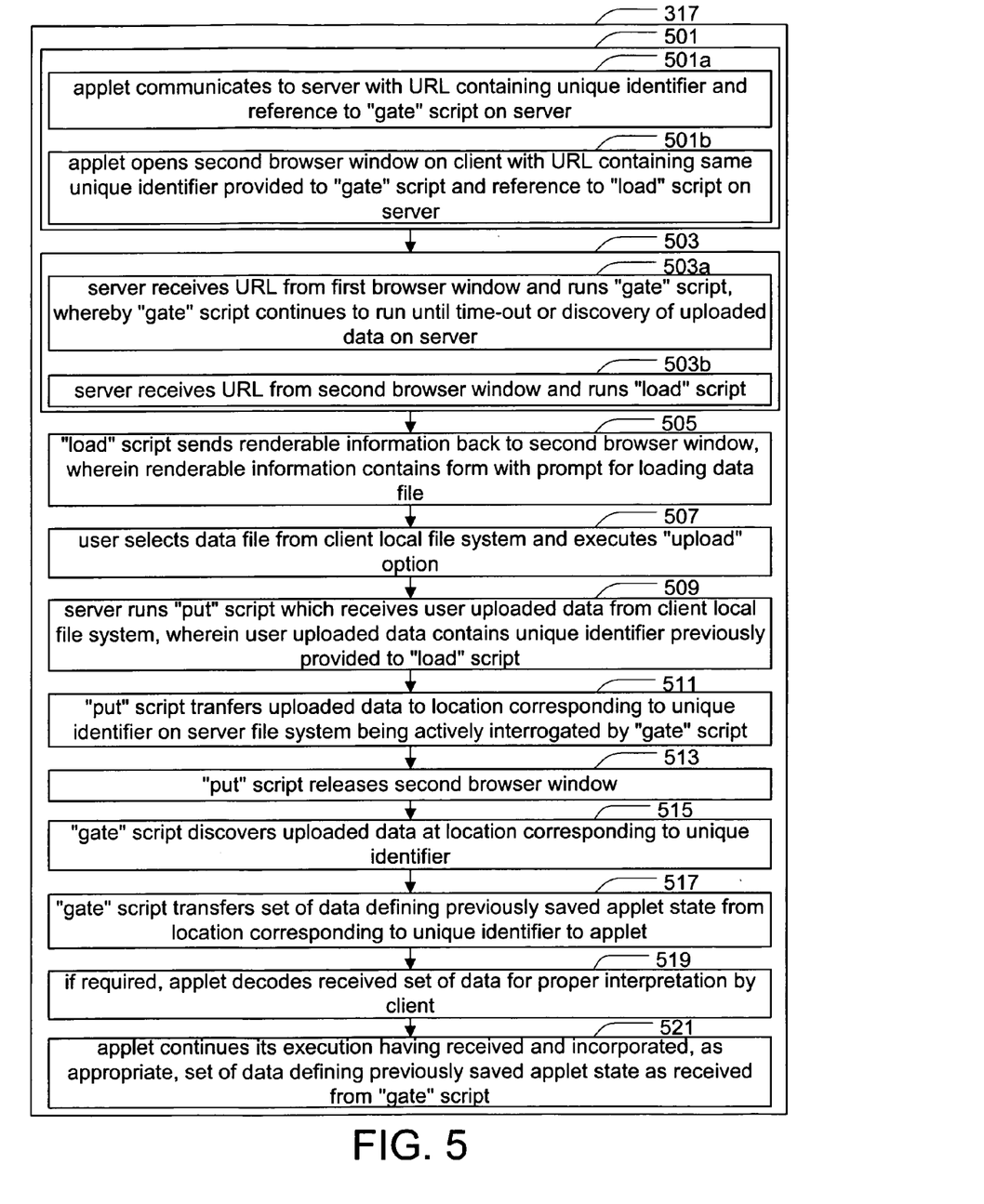
FIG. 5 shows a flowchart illustrating the method for loading the set of data defining the previously saved applet state from the client local file system to the applet, in accordance with one embodiment of the present invention.

FIG. 5 shows a flowchart illustrating the method for loading the set of data defining the previously saved applet state from the client local file system 107 to the applet, in accordance with one embodiment of the present invention. The flowchart shown in FIG. 5 provides a more detailed view of the method referenced in operation 317 of FIG. 3. The method begins with an operation 501 in which two operations, 501a and 501b, are performed. In operation 501a the applet running in the first browser window on the client 119 connects to the server 117 with a URL containing a unique identifier and a reference to a "gate" script located on the server 117. In operation 501b the applet running in the first browser window on the client 119 requests the browser to open a second browser window on the client 119. The applet provides the second browser window with a URL directed to the server 117. The URL provided to the second browser window contains the same unique identifier used in operation 501a and a reference to a "load" script located on the server 117. The method continues with an operation 503 in which two operations, 503a and 503b, are performed. In operation 503a the server 117 receives the URL from the first browser window on the client 119 and runs the "gate" script as directed by the URL. The "gate" script continues to run until it either times-out or supplies uploaded data to the applet running in the first browser window on the client 119, wherein the uploaded data is found on the server 117 with a location corresponding to the unique identifier. In operation 503b the server 117 receives the URL from the second browser window on the client 119 and runs the "load" script as directed by the URL. In an operation 505 the "load" script provides HTML instructions to the second browser window on the client 119 to display a "Load Data" dialog having a user executable "upload" option. The "Load Data" dialog requests a user to select a data file from the client local file system 107, wherein the data file contains a set of data defining a previously saved applet state. The "Load Data" dialog further requests the user to upload data from the selected data file to the server 117 by executing the "upload" option. In an operation 507 the user selects the data file from the client local file system 107 and executes the "upload" option. In response to the user executed "upload" option, an operation 509 is performed in which the server 117 runs a "put" script. A duplicate of the data contained within the user selected data file is provided from the client local file system 107 to the "put" script. The unique identifier previously provided to the "load" script from the second browser window is also provided to the "put" script. In an operation 511 the "put" script transfers the data received from the "load" script to a directory on the server file system 103 that is being actively interrogated by the "gate" script. The "put" script stores the data to a location corresponding to the unique identifier. In an operation 513, the "put" script also releases the second browser window on the client 119. In an operation 515 the "gate" script, actively interrogating the server file system 103, discovers the data having the location corresponding to the unique identifier. In an operation 517 the "gate" script transfers the set of data defining the previously saved applet state from the discovered location to the applet running in the first browser window on the client 119. If the set of data transferred to the applet was previously encoded to satisfy the URL syntax definition, the applet performs an operation 519 to decode the data back into its original (i.e., un-encoded) state. In an operation 521, the applet continues its execution having received and incorporated, as appropriate, the transferred set of data defining the previously saved applet state. It should be understood that the names of the "gate", "load", and "put" scripts can be substituted with other suitable names so long as the corresponding script performs an equivalent function.

The method for loading the set of data defining the previously saved applet state from the client local file system 107 to the applet does not require the applet to obtain access to the client local file system 107. Therefore, the security of the client local file system 107 is not compromised by the method for loading the set of data defining the previously saved applet state.

Figure 6:
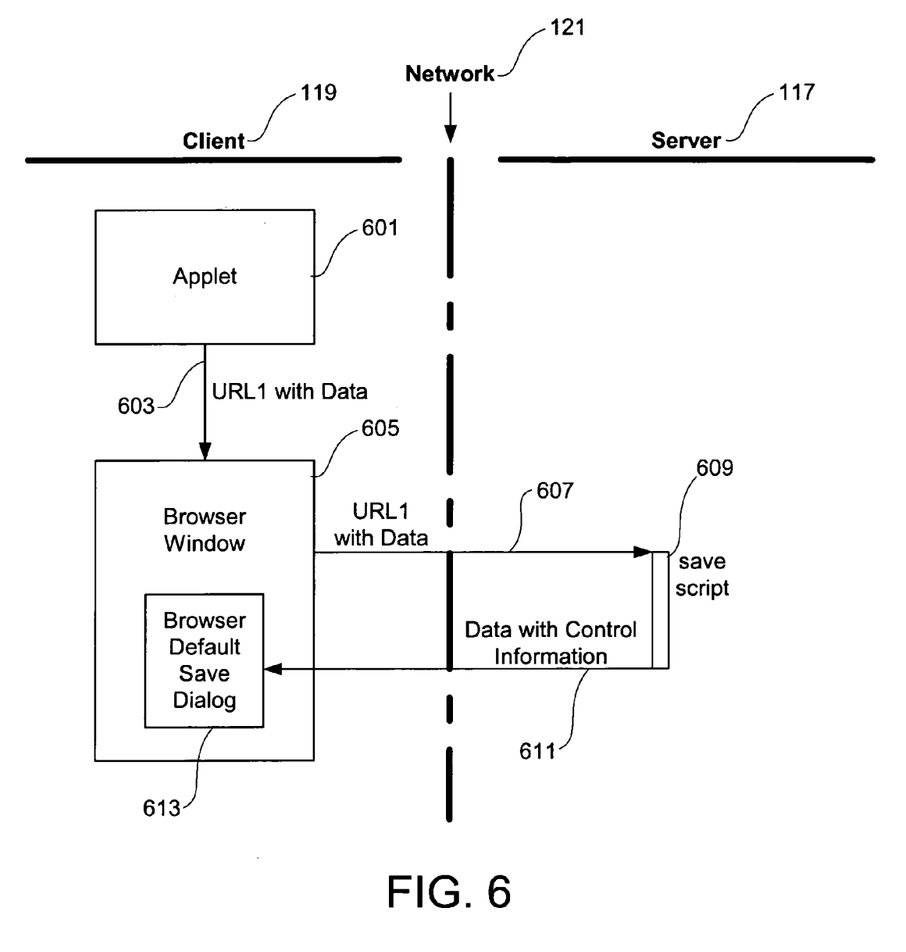
FIG. 6 shows an illustration of the method for saving the set of data defining the current applet state from the applet to the client local file system as described in the flowchart of FIG. 4, in accordance with one embodiment of the present invention.

FIG. 6 shows an illustration of the method for saving the set of data defining the current applet state from the applet to the client local file system 107 as described in the flowchart of FIG. 4, in accordance with one embodiment of the present invention. The client 119 is connected to the server 117 over a network 121. An applet 601 is running on the client 119. Upon receipt of a signal indicating that a save request has been executed by a user, the applet opens a browser window 605 on the client 119 and provides the browser window 605 with a URL containing a set of data defining the current applet state and a reference to a "save" script 609 located on the server 117. The URL provided to the browser window 605 establishes a connection 607 between the browser window 605 and the server 117. Specifically, the URL causes the referenced "save" script 609 on the server 117 to be run. The URL also supplies the "save" script 609 with the set of data defining the current applet state. The "save" script 609 adds control information to the set of data defining the current applet state as provided by the URL. The "save" script 609 sends the set of data defining the current applet state, with added control information, from the server 117 to the browser window 605 through a connection 611. The browser window 605 receives the set of data defining the current applet state, with added control information, but is unable to render the set of data.

Therefore, the browser window 605 provides a browser default save dialog 613 to direct a user to save the set of data to the client local file system 107. It should be understood that the name of the "save" script can be substituted with another suitable name so long as the script performs an equivalent function.

Figure 7:
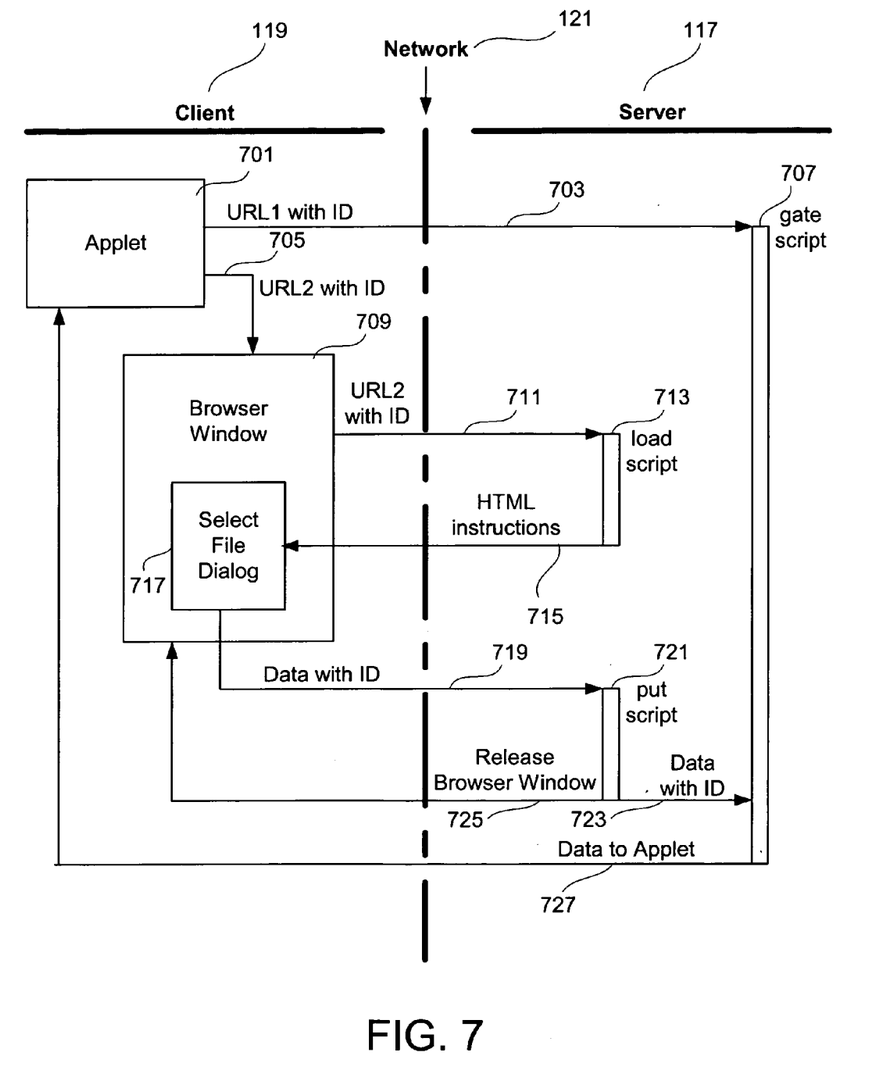
FIG. 7 shows an illustration of the method for loading the set of data defining the previously saved applet state from the client local file system to the applet as described in the flowchart of FIG. 5, in accordance with one embodiment of the present invention.

FIG. 7 shows an illustration of the method for loading the set of data defining the previously saved applet state from the client local file system 107 to the applet as described in the flowchart of FIG. 5, in accordance with one embodiment of the present invention. The client 119 is connected to the server 117 over a network 121. An applet 701 is running on the client 119. Upon receipt of a signal indicating that a load request has been executed by a user, the applet 701 performs two operations. In the first operation, the applet 701 establishes a connection 703 with the server 117 through a first URL referencing a "gate" script 707 located on the server 117. The first URL also contains a unique identifier. Upon receipt of the first URL, the server 117 runs the "gate" script 707. The "gate" script 707 continues to run until it either times-out or supplies uploaded data to the applet 701, wherein the uploaded data is found on the server 117 with a location corresponding to the unique identifier. In the second operation, the applet 701 requests a browser window 709 to be opened on the client 119. The applet 701 provides the browser window 709 with a second URL referencing a "load" script 713 located on the server 117. The second URL also contains the same unique identifier as provided in the first URL. The second URL provided to the browser window 709 establishes a connection 711 between the browser window 709 and the server 117. Specifically, the second URL causes the referenced "load" script 713 on the server 117 to be run. The URL also supplies the "load" script 713 with the unique identifier. The "load" script 713 provides HTML instructions to the browser window 709 through a connection 715. The HTML instructions cause a select file dialog 717 to be displayed in the browser window 709. The select file dialog 717 requests a user to perform an upload operation in which the user selects a data file from the client local file system 107 and uploads data contained within the data file to the server 117, wherein the data file contains a set of data defining a previously saved applet state. In response to the user upload operation, the data and the unique identifier are provided through a connection 719 to a "put" script 721 that is run on the server 117. Through a connection 723, the "put" script 721 transfers the data to a persistent storage on the server file system 103 that is being actively interrogated by the "gate" script 707. The "put" script 721 gives the data a location corresponding to the unique identifier. In this manner, the "put" script 721 provides the data to the "gate" script 707. Through a connection 725, the "put" script also releases the browser window 709 on the client 119. The "gate" script 707, actively interrogating the server file system 103, discovers the data having the location corresponding to the unique identifier. Through a connection 727, the "gate" script 707 transfers the data, corresponding to the set of data defining the previously saved applet state, to the applet 701. The applet 701 continues its execution having received and incorporated, as appropriate, the transferred set of data defining the previously saved applet state as received from the "gate" script 707. It should be understood that the names of the "gate", "load", and "put" scripts can be substituted with other suitable names so long as the corresponding script performs an equivalent function.

The methods described in FIGS. 3–7 can be implemented as a computer program using a variety of different programming languages and techniques. In one embodiment, a combination of Java and script programs are used to implement the methods. Exemplary program instructions for implementing the methods described in FIGS. 3–7 are presented in Tables 1 through 5. Table 1 presents an exemplary Java program for saving and loading applet data to and from, respectively, a client local file system. Table 2 presents an exemplary UNIX bash shell script used in conjunction with a "save" method in the exemplary Java program. Tables 3, 4, and 5 present exemplary UNIX bash shell scripts used in conjunction with a "load" method in the exemplary Java program.

TABLE 1

DataSaver.java

```
import java.applet.Applet;
import java.awt.*;
import java.awt.event.*;
import java.io.*;
import java.net.MalformedURLException;
import java.net.URL;
public class DataSaver extends Applet implements ActionListener {
    private Button resetButton = new Button("Reset");
    private Button saveButton = new Button("Save");
    private Button loadButton = new Button("Load");
    private TextField textField = new TextField("default", 20);
    private String baseURL ;
    public void init ( ) {
        System.out.println("Init called !");
        setLayout (new GridLayout(4,1));
        add(textField);
        add(resetButton);
        add(saveButton);
        add(loadButton);
        resetButton.addActionListener(this);
        saveButton.addActionListener(this);
        loadButton.addActionListener(this);
        repaint ( );
        String codeBase = getCodeBase ( ) .getHost ( );
        int port = getCodeBase ( ) .getPort ( );
        baseURL = "http://"+codeBase+" : "+port+"/cgi-bin/datasaver/";
        getAppletContext ( ) .showStatus("Applet DataSaver loaded");
    }
    public void paint (Graphics g) {
    }
    public void actionPerformed(ActionEvent e) {
        String cmd = e.getActionCommand ( );
        if ("Save" .equals(cmd)) {
            save ( );
        }
        if ("Load" .equals(cmd)) {
            load ( );
        }
        if ("Reset" .equals(cmd)) {
            textField.setText ("default")
            repaint ( );
        }
    }
    private void save ( ) {
        String data = textField.getText ( );
        getAppletContext ( ) .showStatus ("Saving data . . . ");
        try {
            ByteArrayOutputStream core = new ByteArrayOutputStream( );
            ObjectOutputStream javaStream = new ObjectOutputStream(core);
            javaStream.writeObject (data);
            javaStream.flush ( );
            core.flush ( );
            byte [ ] binary = core.toByteArray ( );
            String encoded = encode(new String(binary));
            URL saveDocument = new URL(baseURL+"save.sh?data="+encoded);
            getAppletContext ( ) .showDocument (saveDocument, "_blank");
            getAppletContext ( ) .showStatus("Saving done");
        }   catch (Exception e) {
            System.err.println ("Error saving the data");
            e.printStackTrace ( );
            getAppletContext ( ) .showStatus("Saving failed");
        }
    }
    private void load ( ) {
        getAppletContext ( ) .showStatus ("Loading data . . . ");
        try {
            String uniqueId = "abcd";
            uniqueId = encode(uniqueId);
```

TABLE 1-continued

DataSaver.java

```
                URL loadDocument = new URL(baseURL+"gate.sh?data="+uniqueId);
                URL loadPage = new URL(baseURL+"load.sh?data="+uniqueId);
                getAppletContext ( ) .showDocument (loadPage "_blank");
                ByteArrayOutputStream store = new ByteArrayOutputStream ( );
                InputStream input = loadDocument.openStream ( );
                while (true) {
                    byte [ ] buffer = new byte [256];
                    int nr = input.read (buffer);
                    if (nr > 0)
                        store.write(buffer, 0, nr);
                    }
                    if (nr <= 0)
                        System.err.println ("NR is <0 ? ("+nr+")");
                        break;
                    }
                        System.out.println ("Read chunk "+nr+" bytes");
                }
                store.flush ( );
                byte [ ] storage = store.toByteArray ( );
                storage = decode(new String(storage));
                System.out.println("Storage is "+storage.length+" bytes");
                for (int i=0; i<storage.length; i++) {
                    System.out.print ("0x"+Integer.toHexString ((int)storage [i] ));
                }
                System.out.println ( );
                ObjectInputStream javaStream =
                    new ObjectInputStream(new ByteArrayInputStream(storage));
                String data = (String) javaStream.readObject ( );
                textField.setText (data);
                getAppletContext ( ) .showStatus ("Loading done");
        } catch (Exception e) {
                System.err.println ("Error loading the data");
                e.printStackTrace ( );
                getAppletContext ( ) .showStatus ("Error loading the data");
        }
        repaint ( );
    }
    private String encode (String s) {
        String aux = new String ( );
        for (int i= 0; i<s.length ( ); i++) {
            boolean cvt = true;
            char c = s.charAt (i);
            if (c == ' ') {
                aux += "+";
                continue;
            }
            if ( ( ( c >= 'a' ) && ( c <= 'z' ) ) | |
                ( ( c >= 'A' ) && (c <= 'Z' ) ) | |
                ( ( c >= '0' ) && (c <= '9' ) ) ) {
                    cvt = false;
            } else {
                switch (c) {
                    case '.':
                    case '-':
                    case '*':
                    case '_':
                        cvt = false;
                }
            }
            if (!cvt) {
                aux += c;
                continue;
            }
            String hx = Integer.toHexString (c);
            if (hx.length ( ) == 1) { hx = '0' + hx; }
            hx = '%' + hx;
            aux += hx;
        }
        return aux;
    }
    private byte [ ] decode ( String s ) {
        ByteArrayOutputStream aux = new ByteArrayOutputStream ( );
        int pos = 0;
        while (true) {
            if (pos >= s.length( )) { break; }
            char c = s.charAt(pos);
            pos++;
```

TABLE 1-continued

DataSaver.java

```
            switch (c) {
                case '+':
                    aux.write((byte) ' ');
                    break;
                case '%':
                    String hex =
                    new String( ) + s.charAt (pos) +s.charAt (pos+1);
                    byte data = (byte) Integer.parseInt (hex, 16);
                    aux.write(data);
                    pos += 2;
                    break;
                default:
                    aux.write((byte)c);
                    break;
            }
        }
        try { aux.flush ( ); } catch (Exception e) { }
        return aux.toByteArray ( );
    }
}
```

TABLE 2 save.sh

```
# !/bin/bash
lbound="HI-MILA"
echo "Transfer-encoding: chunked\n\r"
echo "Content-Type: multipart/mixed; boundary=\"$1bound\"\n\r"
echo
echo "--$1bound\n\r"
echo "Content-Type: text/HTML; charset=ISO-8859-1\n\r"
echo
cat << __EOF__
<html>
<head><title>Save data</title></head>
<body>
<script type="text/javascript">
window.resizeTo(300, 300);
</script>
<form action= "/">
<input type="button" value="Close Window" type="submit"
onclick="{ window.close ( ); }">
</form>
</body>
</html>
__EOF__
data=`echo $QUERY_STRING | sed ´s/^data=//g´`
len=`echo -e $data | wc -c`
len=`expr $len + 0`
echo "--$1bound"
sleep 2
echo "Content-type: application/OCTET-STREAM\n\r"
echo "Content-Length: $len\n\r"
echo "Content-Disposition: data; filename=\"javaString.bin\"\n\r"
echo
echo -e $data
echo "--$1bound\n\r"
echo "Content-Type: text/HTML; charset=ISO-8859-1\n\r"
echo
cat << __EOF__
<html>
<head><title>Save data</title></head>
<body>
This window should go !
<script type="text/javascript">
window.close ( );
</script>
</body>
</html>
__EOF__
echo "--$1bound--\n\r"
```

TABLE 3 load.sh

```
# !/bin/bash
data=`echo $QUERY_STRING | sed ´s/^data=//g´`
echo -e "Content-type: text/html; encoding=\"us-ascii\""
echo
cat << __EOF__
<html>
<head>
<title>Load data</title>
</head>
<body>
<script type="text/javascript">
window.resizeTo(300, 300);
</script>
<form method="post" action="/cgi-bin/datasaver/put.sh"
enctype="multipart/form-data">
<input name="${data}" type="file" value="javaString.bin">
<br>
<input type="submit" value=Load data">
</form>
</body>
</html>
__EOF__
```

TABLE 4 gate.sh

```
# !/bin/bash
timeout=25
data= echo $QUERY_STRING | sed ´s/^data=//g´`
while [ ! -f /tmp/$data.tmp ] ; do
    timeout=$(expr $timeout − 1)
    [ $timeout -eq 0 ] && { break; }
    sleep 1
done
echo "Content-type: application/OCTET-STREAM"
echo
[ ! -f /tmp/$data.tmp ] && {
    echo "Timeout waiting for user" 2>&1
    echo
    exit
}
cat /tmp/$data.tmp
rm -f /tmp/$data.tmp
```

TABLE 5 put.sh

```
# !/bin/bash
l=""
while [-z "$1" ]; do
    read -r 1
done
read -r 1
echo "Content-type: text/html; encoding=\"us-ascii\""
echo
cat << _EOF_
<html>
<head><title>Transferring data</title></head>
<body>
<pre>
_EOF_
echo "1=$1"
name=$(echo $1|awk '{print $3}')
echo "name = $name";
names=$(echo $name | /usr/bin/sed 's/.*"\(.*\)";$/\1/')
echo "name = $name";
1="a"
read -r 1
read -r 1
read -r 1
echo "Sending line $1"
echo $1 > /tmp/$name.tmp
cat << _EOF_
</pre>
This window should go !
<script type="text/javascript">
window.close ( );
</script>
</body>
</html>
_EOF_
```

Although the flowchart operations have been described in a particular order, it should be understood that the order of execution may differ. In one example, the order of execution may proceed in parallel or serially depending on the specific algorithm and hardware implementation. In another example, the order of the functional operations may be rearranged.

Further, the above described invention has been described in the general context of an application program that is executed on an operating system in conjunction with a test system. It should be appreciated that the invention may be implemented with other routines, programs, components, data structures, etc., which perform particular tasks or implement particular abstract data types. Furthermore, the invention may be practiced with other computer system configurations including hand-held devices, microprocessor systems, microprocessor-based or programmable consumer electronics, minicomputers, mainframe computers and the like.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A method for saving data from an applet to a local file system, comprising:

downloading an applet from a server computer system to a client computer system;

executing the applet at the client computer system, the executing producing a current applet state defined by a set of data;

opening a browser window at the client computer system, the opening of the browser window being directed by the applet;

providing a universal resource locator (URL) to the browser window, the URL being provided to the browser window by the applet, the URL referencing a script located on the server computer system, the URL providing the set of data to the script;

executing the script located on the server computer system, the script execution being initiated by the URL referencing the script;

sending the set of data from the server computer system to the browser window at the client computer system, the sending of the set of data being performed by the script; and displaying a dialog within the browser window at the client computer system, the dialog directing a user to select a location on a local file system of the client computer system for saving the set of data that defines the current applet state.

2. A method for saving data from an applet to a local file system as recited in claim 1, further comprising:

presenting a save option within the applet executing at the client computer system, the save option being executable by a user of the client computer system.

3. A method for saving data from an applet to a local file system as recited in claim 2, further comprising:

receiving a signal indicating execution of the save option within the applet executing at the client computer system, the signal indicating execution of the save option continuing the method for saving data from the applet to the local file system.

4. A method for saving data from an applet to a local file system as recited in claim 1, further comprising:

writing the set of data to a buffer prior to providing the URL to the browser window.

5. A method for saving data from an applet to a local file system as recited in claim 4, further comprising:
encoding the set of data in the buffer to be properly interpreted by the server computer system, the encoding being performed prior to providing the URL to the browser window.

6. A method for saving data from an applet to a local file system as recited in claim 5, wherein the URL provides the encoded set of data to the script, the script sending the encoded set of data from the server computer system to the browser window at the client computer system.

7. A method for saving data from an applet to a local file system as recited in claim 1, further comprising:
adding control information to the set of data, the control information being added by the script prior to sending the set of data from the server computer system to the browser window at the client computer system.

8. A method for loading data from a local file system to an applet, comprising:
downloading an applet from a server computer system to a client computer system;
executing the applet in a first browser window at the client computer system;
communicating to the server computer system with a first universal resource locator (URL), the communicating being performed by the applet, the first URL referencing a first script located on the server computer system;
opening a second browser window at the client computer system, the opening of the second browser window being directed by the applet;
providing the second browser window with a second URL, the second URL being provided to the second browser window by the applet, the second URL referencing a second script located on the server computer system;
executing the first script located on the server computer system, the first script execution being initiated by the first URL referencing the first script, the first script interrogating the server computer system;
executing the second script located on the server computer system, the second script execution being initiated by the second URL referencing the second script, the second script providing a dialog within the second browser window at the client computer system, the dialog directing a user to select a file located on a local file system of the client computer system, the file containing a set of data defining a previous applet state to be transferred to the server computer system;
transferring a set of data from a user selected file on a local file system of the client computer system to the server computer system, wherein the transferred set of data is received by a third script located on the server computer system;
executing the third script located on the server computer system, the third script execution being initiated by the transfer of the set of data from the user selected file, the third script placing the transferred set of data on the server computer system, wherein the transferred set of data is identified by the first script interrogating the server computer system; and
transferring the set of data defining the previous applet state from the server computer system to the applet.

9. A method for loading data from a local file system to an applet as recited in claim 8, further comprising:
presenting a load option within the applet executing in the first browser window at the client computer system, the load option being executable by a user of the client computer system.

10. A method for loading data from a local file system to an applet as recited in claim 9, further comprising:
receiving a signal indicating execution of the load option within the applet executing in the first browser window at the client computer system, the signal indicating execution of the load option continuing the method for loading data from the local file system to the applet.

11. A method for loading data from a local file system to an applet as recited in claim 8, further comprising:
decoding the set of data transferred from the server computer system to the applet, the decoding being performed by the applet, the decoded set of data being interpretable by the client computer system.

12. A method for loading data from a local file system to an applet as recited in claim 8, further comprising:
using a unique identifier to facilitate identification of the transferred set of data by the first script interrogating the server computer system.

13. A method for loading data from a local file system to an applet as recited in claim 8, further comprising:
releasing the second browser window at the client computer system, the releasing being directed by the third script located on the server computer system.

14. A computer program embodied on a computer readable medium for saving data from an applet to a local file system, the computer program comprising:
program instructions for downloading an applet from a server computer system to a client computer system;
program instructions for executing the applet at the client computer system, the executing producing a current applet state defined by a set of data;
program instructions for opening a browser window at the client computer system, the opening of the browser window being directed by the applet;
program instructions for providing a universal resource locator (URL) to the browser window, the URL being provided to the browser window by the applet, the URL referencing a script located on the server computer system, the URL providing the set of data to the script;
program instructions for executing the script located on the server computer system, the script execution being initiated by the URL referencing the script;
program instructions for sending the set of data from the server computer system to the browser window at the client computer system, the sending of the set of data being performed by the script; and
program instructions for displaying a dialog within the browser window at the client computer system, the dialog directing a user to select a location on a local file system of the client computer system for saving the set of data that defines the current applet state.

15. A computer program embodied on a computer readable medium for saving data from an applet to a local file system as recited in claim 14, further comprising:
program instructions for presenting a save option within the applet executing at the client computer system, the save option being executable by a user of the client computer system.

16. A computer program embodied on a computer readable medium for saving data from an applet to a local file system as recited in claim 15, further comprising:
program instructions for receiving a signal indicating execution of the save option within the applet executing at the client computer system, the signal indicating execution of the save option continuing the method for saving data from the applet to the local file system.

17. A computer program embodied on a computer readable medium for saving data from an applet to a local file system as recited in claim 14, further comprising:

program instructions for writing the set of data to a buffer prior to providing the URL to the browser window.

18. A computer program embodied on a computer readable medium for saving data from an applet to a local file system as recited in claim 17, further comprising:

program instructions for encoding the set of data in the buffer to be properly interpreted by the server computer system, the encoding being performed prior to providing the URL to the browser window.

19. A computer program embodied on a computer readable medium for saving data from an applet to a local file system as recited in claim 18, wherein the URL provides the encoded set of data to the script, the script sending the encoded set of data from the server computer system to the browser window at the client computer system.

20. A computer program embodied on a computer readable medium for saving data from an applet to a local file system as recited in claim 14, further comprising:

program instructions for adding control information to the set of data, the control information being added by the script prior to sending the set of data from the server computer system to the browser window at the client computer system.

21. A computer program embodied on a computer readable medium for loading data from a local file system to an applet, comprising:

program instructions for downloading an applet from a server computer system to a client computer system;

program instructions for executing the applet in a first browser window at the client computer system;

program instructions for communicating to the server computer system with a first universal resource locator (URL), the communicating being performed by the applet, the first URL referencing a first script located on the server computer system;

program instructions for opening a second browser window at the client computer system, the opening of the second browser window being directed by the applet;

program instructions for providing the second browser window with a second URL, the second URL being provided to the second browser window by the applet, the second URL referencing a second script located on the server computer system;

program instructions for executing the first script located on the server computer system, the first script execution being initiated by the first URL referencing the first script, the first script interrogating the server computer system;

program instructions for executing the second script located on the server computer system, the second script execution being initiated by the second URL referencing the second script, the second script providing a dialog within the second browser window at the client computer system, the dialog directing a user to select a file located on a local file system of the client computer system, the file containing a set of data defining a previous applet state to be transferred to the server computer system;

program instructions for transferring a set of data from a user selected file on a local file system of the client computer system to the server computer system, wherein the transferred set of data is received by a third script located on the server computer system;

program instructions for executing the third script located on the server computer system, the third script execution being initiated by the transfer of the set of data from the user selected file, the third script placing the transferred set of data on the server computer system, wherein the transferred set of data is identified by the first script interrogating the server computer system; and program instructions for transferring the set of data defining the previous applet state from the server computer system to the applet.

22. A computer program embodied on a computer readable medium for loading data from a local file system to an applet as recited in claim 21, further comprising:

program instructions for presenting a load option within the applet executing in the first browser window at the client computer system, the load option being executable by a user of the client computer system.

23. A computer program embodied on a computer readable medium for loading data from a local file system to an applet as recited in claim 22, further comprising:

program instructions for receiving a signal indicating execution of the load option within the applet executing in the first browser window at the client computer system, the signal indicating execution of the load option continuing the method for loading data from the local file system to the applet.

24. A computer program embodied on a computer readable medium for loading data from a local file system to an applet as recited in claim 21, further comprising:

program instructions for decoding the set of data transferred from the server computer system to the applet, the decoding being performed by the applet, the decoded set of data being interpretable by the client computer system.

25. A computer program embodied on a computer readable medium for loading data from a local file system to an applet as recited in claim 21, further comprising:

program instructions for using a unique identifier to facilitate identification of the transferred set of data by the first script interrogating the server computer system.

26. A computer program embodied on a computer readable medium for loading data from a local file system to an applet as recited in claim 21, further comprising:

program instructions for releasing the second browser window at the client computer system, the releasing being directed by the third script located on the server computer system.

* * * * *